Feb. 14, 1939.　　　F. B. BEUTKE　　　2,146,931
SHIELD FOR DISK HARROWS
Filed June 13, 1938　　　2 Sheets-Sheet 1
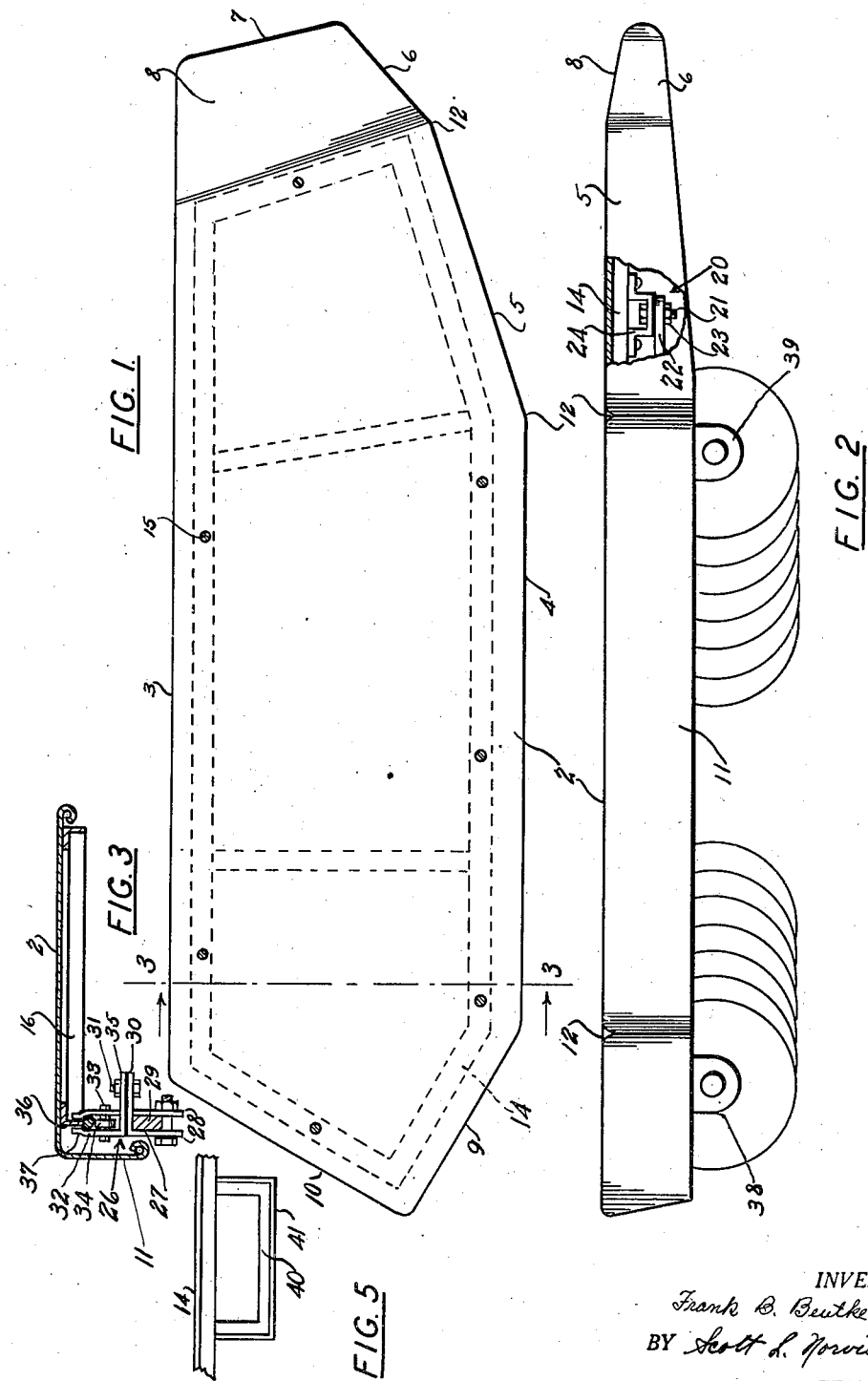
INVENTOR.
Frank B. Beutke
BY Scott L. Norviel
ATTORNEY Feb. 14, 1939.　　　F. B. BEUTKE　　　2,146,931
SHIELD FOR DISK HARROWS
Filed June 13, 1938　　　2 Sheets-Sheet 2
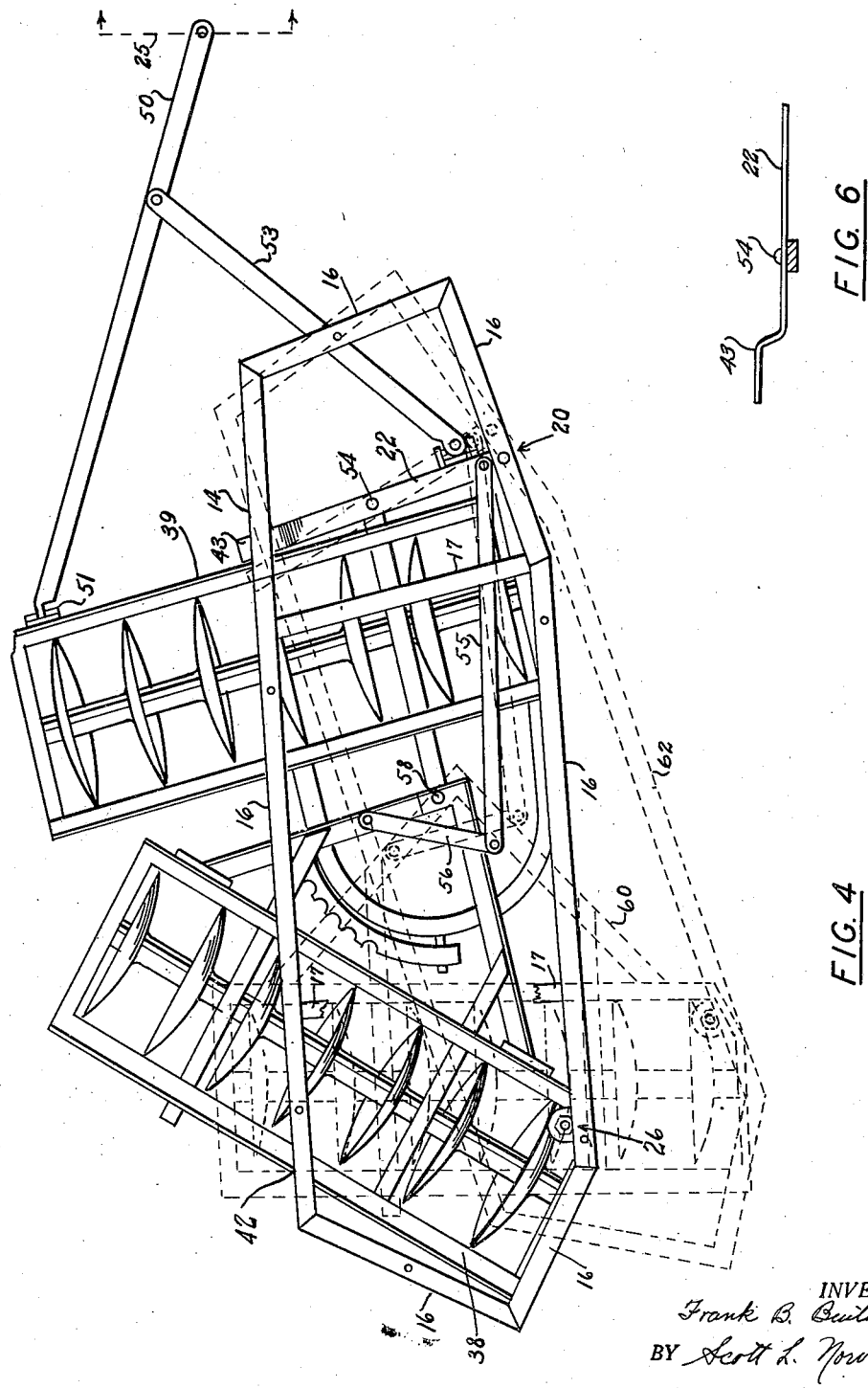
INVENTOR.
Frank B. Beutke
BY Scott L. Norviel
ATTORNEY Patented Feb. 14, 1939

2,146,931

UNITED STATES PATENT OFFICE 2,146,931

SHIELD FOR DISK HARROWS

Frank B. Beutke, Maricopa County, Ariz.

Application June 13, 1938, Serial No. 213,401

5 Claims. (Cl. 55—83)

My invention relates to shields for orchard disk harrows, particularly of the adjustable offset type. These harrows are made so that in operation they will swing out to one side of the center of draft to allow the means of draft to be operated between rows of trees while the harrow cuts very close to the trunks of the trees and directly over the root area. Harrows of this type usually consist of two trucks or frames each carrying a plurality of disks revolving on axles extending laterally in the truck frames. The trucks are joined together so that the axes of these axles may be varied relative to the direction of forward motion, and varied relative to each other. This adjustment may be accomplished by means of a swinging draw bar and yoke attached to the forward truck and a horizontally hinged or swing connection between the forward and rear truck. As the angles of the axles of the disks are varied the angle of cut and direction of drag of the disks is changed accordingly. Various means are employed to secure adjustment of these angles both relative to the draw bar and relative to the trucks themselves. These means are well known to those familiar with the art. In making a turn with a harrow of this type it is necessary to change the direction of cut by adjusting the angle of the axles to approximate radii of the center of turn, in order to prevent digging in. Thus, in making a right hand turn the axles are adjusted to an extreme and relatively opposite angle from their position in making a left hand turn. In operative position for forward motion their axle angles are set at a pre-determined angle intermediate these two extremes.

Since the trees in citrus orchards necessarily have low hanging limbs and foliage carrying fruit, it has been found necessary to provide a shield which will prevent this foliage and fruit from coming in contact with the sharp edges and moving parts of these harrows. While some attempt has been made to attach shields to certain types of harrows, such previously made models have been found impractical when attached to offset harrows of the type above mentioned; particularly those adapted to make a right turn.

I have found that a shield, as herein contemplated, must entirely shield the outer frame portions, disks, and moving parts of the harrow, must be attached thereto so that it will not interfere with the adjustment motions of the trucks and draft bars of the harrow, and must maintain its position thereon at all times with a minimum of protruding parts extending beyond the outer edges of the harrow truck frames.

Accordingly, the objects of my invention are to provide a shield to cover one side of a disk orchard harrow, whereby the harrow may be operated close to the trunks of the trees and under the lowermost limbs thereof without cutting or damaging the same or fruit growing thereon; a second object is to provide such a device which may be operatively attached to orchard harrows of the offset type which will remain in position on said harrow throughout all operative adjustments thereof; a third object is to provide a shield of the type described which may be operatively attached to an offset disk harrow so that it may maintain its position throughout any adjustments of the axles of the harrow during operation, whether for left or right hand turns or otherwise, and at the same time maintain the outer edge of said shield in fixed relation with a minimum distance from the outer cutting edges of the disks; a fourth object is to provide a shield of the type described, adapted to be supported on a harrow as above mentioned, whereby fixed and adjustable means of support is provided on those portions of the harrow frames nearest the outermost cutting disks; a fifth object is to provide means of attachment to and retention of a shield of the type described on an offset orchard harrow, so there is a minimum amount of vibration of the shield upon the harrow frames; and a sixth object is to provide a harrow shield of the type described which may be quickly and easily attached to and removed from the harrow frames.

I attain the foregoing objects by means of the structure, construction and devices illustrated in the accompanying drawings in which—

Figure 1 is a plan view of my shield;

Figure 2, a side elevation thereof;

Figure 3, a section taken substantially on line 3—3, Fig. 1;

Figure 4, a perspective plan view of an offset harrow with my shield supporting frame in place thereof with the shield body removed, and with adjustment movements of the harrow, together with corresponding motions of the shield frame, indicated in dotted outline;

Figure 5, a fragment of the shield supporting frame showing the inner rear support in elevation; and Figure 6, a front elevation of one of the harrow draw bar levers, showing means of support for the inner front edge of said shield frame.

Similar numerals refer to similar parts in all views.

The shield body, generally designated by numeral 2, is preferably made of one piece of No. 10 gauge sheet steel. The contour as viewed from above and shown in Figure 1 indicates that the inside edge 3 and outer edge 4 are approximately parallel. Angularly positioned edges 5, 6 and 7 complete the contour of the front end of this shield body forming a nose 8, which is angularly depressed forwardly. Angular edges 9 and 10 form a trailing edge. The top of the shield body is approximately flat, except the nose portion 8. Outer edges 4, 5, 6 and 9 are bent downward at right angles to form an apron 11. The seams where these downwardly bent portions adjoin are welded, as at 12. Inner edges 3, 7 and 10 are rolled to form a round edge.

This shield body is supported on and fixed to a supporting frame 14 by screws 15. This supporting frame is preferably made of angle iron. Straight lengths of angle iron 16 are cut and shaped and welded to substantially follow the perimeter of the shield body, as above described. Cross members 17 may be added for strength and rigidity. The shield body overlaps the frame about 2 inches all around, except for the nose, and this extends ordinarily about 12 inches beyond the front member of the frame.

In order to attach this supporting frame to the harrows, I provided first, a fixed swivel 20 joining an outer member of the frame near the forward end and an outer pre-determined portion of the forward truck frame. As here illustrated, this member is preferably the lever bar 22, used in adjusting the relatively operative angles of the harrow trucks. However, in types of harrows not having such a bar, attachment of this swivel support may be made to any convenient member of the forward harrow truck frame so long as it is positioned near the outer edge thereof, or otherwise near to the outermost cutting disk of the forward harrow gang.

Bolt 21 is provided with a lock nut 23 of any desired type and is sized to turn freely in the holes in the member it joins. Its upper end is engaged in a downwardly depending stirrup-shaped support 24 which has a flat base to form a horizontal bearing surface on draw bar 22. The upwardly extending arms of this support are of sufficient length to hold the frame member 16 an adequate distance above the plane of attachment to clear all parts of the harrow frame.

Next I provided a support 26 at the outer rear portion of the shield frame consisting of a longitudinally slidable pivot. Thus support must form a means of retention of the shield frame vertically and laterally relative to the rear truck, but must be movable longitudinally relative to the front support and also allow free pivotal movement. This support is composed of a lower member 27 having a downwardly depending fork 28 adapted to be bolted to an outer end member 29 of the rear truck frame. (See Figure 3.) At right angles to this fork an inwardly extending plate 30 forms the base of a turn table and is pierced to receive a swivel bolt 31. Counterpoised above this is an upwardly extending fork member 32 having a U-shaped section with the arms converging somewhat at the upper ends to form a means of retention for the portion of the shield frame to be held therein. Below this converging portion is a transverse pin 33 supporting a roller 34. At right angles to support 32 is a horizontally extending plate 35, the bottom face of which forms the upper portion of a turn table resting on plate 30. This is also drilled to receive swivel bolt 31.

The support 26 is so positioned on the rear harrow frame 38 that the upper fork will receive and retain the downwardly extending side 36 of angle bar frame 16. A rod 37 is welded along the lower edge of side 36 a sufficient distance equal to any longitudinal movement that may be made by support 26 on frame 14. The diameter of this rod is large enough to be retained by the converging edges of member 32 and is adapted to be supported by and roll on roller 34.

To support the inner edge of frame 14 I provided two sliding and turning rests. At the rear a U-shaped support 40 has a flat lower surface 41 of sufficient length to maintain contact with any convenient portion of rear truck frame 38, as at 42, throughout any usual turning movement. At the front the shield frame 14 is supported by resting on a rounded up-turned inner end portion 43 of harrow lever 22. Optionally a support similar to the U-shaped rear support 40 may be attached to frame 14 at a convenient position along its inner edge near the front and adapted to contact a member of the front truck frame.

In operation, the shield is attached to the harrow as described. Ordinarily the trucks are set as shown in Figure 4, and the harrow operated in a straight line in the direction indicated at 25 by any convenient means of draft. When it is necessary to turn at the end of a row of trees the harrow is angled as indicated by dotted outline 60. When this is done the forward outer pivot provides turning movement but retains the shield in position in all other respects; the rear support 26 accommodates turning movement and the necessary longitudinally sliding movement but forms a means of retention otherwise; and the inner supports form gravity rests permitting the shield frame to turn and slide horizontally in any direction made necessary by the adjustment of the harrow.

As shown in Figure 4, a harrow of this off-set type has a draw bar 50 attached by a clevis 51 to a portion of the frame of the forward harrow truck 39; an angular adjustable draw bar 53 is attached by a clevis to lever 22 near the extreme right side of the harrow frame. Lever 22 is fulcrumed at 54 and through a system of bars and levers 55 and 56 communicates motion to the rear truck 38 in order to swing it on king pin 58. To effect a right hand turn, this motion is counterclockwise. This adjustment of the harrow trucks is made to prevent "digging in" on the turn. In actual operation manually operated levers are used to hold the draw bar and trucks in any desired position. These levers and their attendant parts are not illustrated in the figure since they are not essentially a part of this invention and their addition would unnecessarily complicate the drawings.

The turning motion of the harrow truck, as indicated in Figure 4, by dotted outline 60, clearly shows that since the shield frame 14 is pivotally supported at the outer right side of both truck frames, the shield frame follows the movement of the harrow trucks as indicated by dotted outline 62. The distance from the edge of the trucks to the outside of apron 11 on the shield is, therefore, always the same. If the point of pivot should be made near the inner edge of the shield, it is obvious that, in order to avoid contact with the trucks in movements such as shown, the shield would have to be built out much further, and cultivation could not be made as near to the trunks of the trees as in the present construction, without contact of the apron there-with. It is, therefore, important that the pivot points of support be on the outer (right hand) edges of both truck frames. Further, it has been found that vibration of the harrow frames when operated over rough ground is greatest at the edges and least near the center. Therefore, it is important that the vertical retention by the pivots be at the outer edges of the trucks; the inner edges of the shield frame may then be left free to turn and slide on gravity rests only.

When it is desired to remove the shield from the harrow, nut 23 is unscrewed and bolt 21 removed. The shield and frame is then moved backward until the beaded runway 37 passes beyond the retention of U-support 32. When this is done the entire shield may be removed from the harrow.

While I have shown my shield attached to but one type of harrow, it will be readily understood by those familiar with the art that it is easily adaptable to attachment to other types of two-gang adjustable harrows and since various changes and modifications may be suggested by the foregoing, I wish to be limited only by the following claims.

I claim:

1. A shield for orchard disk harrows of the off-set type comprising a shield body having an approximately flat top, a smoothly rounded outer contour, and an apron downwardly depending therefrom, means of supporting said shield upon said harrow, including an outer forward pivotal support, a slidable and pivotal rear outer support, and unattached gravity rests along the inner portion of said shield.

2. A shield for orchard disk harrows comprising, in combination, a shield having a body adapted to cover the outer portions of said harrow truck frames having an approximately flat smooth top, an outer contour smoothly converging toward the inner edge at front and rear, and an apron depending therefrom; means for attaching said shield to the harrow frames including a fixed vertical pivot on the forward outer portion of said shield, a longitudinally slidable vertical pivot on the rear outer portion of said shield, and sliding rests along the inner portion of said shield.

3. A shield for off-set orchard harrows comprising a shield body having a flat top, a smoothly rounded apron extending downward along the outer edge, a supporting frame adapted to support said shield body on said harrow, a vertical pivotal support on said frame adapted to attachment to the outer portion of the forward harrow truck frame, a longitudinally slidable pivotal means of support on the rear portion of said shield frame adapted to attachment to the outer portion of the rear truck frame of said harrow, and slidable supporting means along the inner edge of said shield frame adapted to rest on central portions of the harrow frames.

4. A shield for adjustable orchard disk harrows comprising, in combination, a shield body having a flat top, tapering forward and rear ends, a downwardly depending apron along the contour of the outer edge, a vertical pivotal forward support adapted to attachment to the outer portion of the forward harrow frame, a slidable vertical pivotal support adapted to attachment to the outer portion of the rear harrow frame, and a plurality of unattached rests adapted to support the inner edge of the shield by contact with central portions of said harrow frames.

5. A shield for off-set orchard harrows having a body, including a smooth flat top, a converging declining nose portion, tapering trailing edge and a downwardly extending apron along the outer contour thereof; in combination with a shield frame adapted to afford means of support for said shield body, and means of attachment of said shield frame to said harrow, including a swivel pin operatively fixed to the outer forward portion of said shield frame, a slidable swivel pin operatively attached to the outer rear portion of said frame and rests adapted to contact inner portions of said harrow frame throughout all adjustment motions thereof.

FRANK B. BEUTKE.